Aug. 11, 1964   J. E. JOHNSON ETAL   3,144,160
RECEPTACLES WITH VACUUM CELL UNITS OR THE LIKE
Filed Nov. 3, 1961
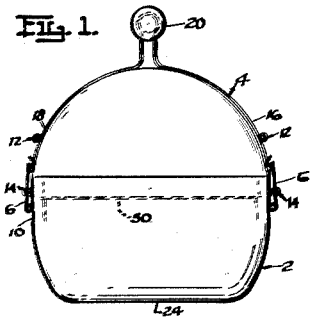
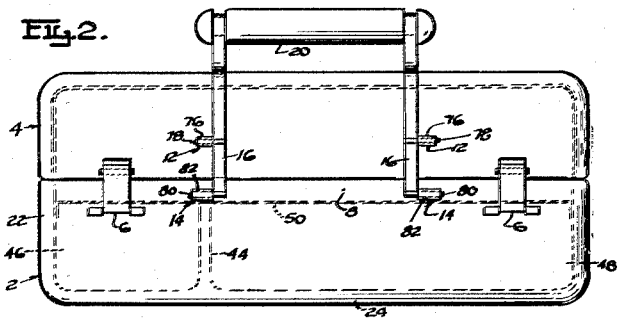
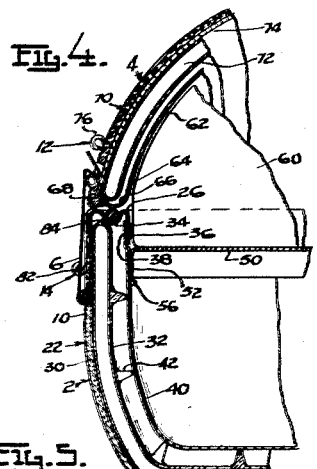
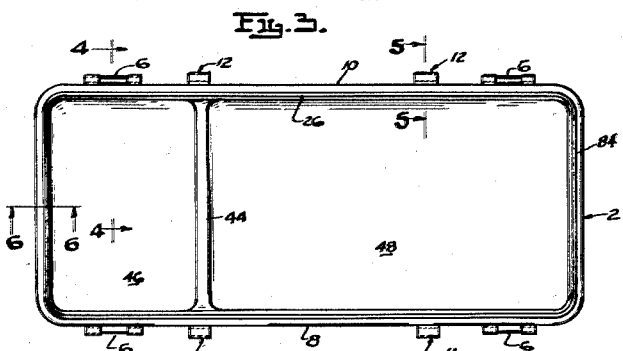
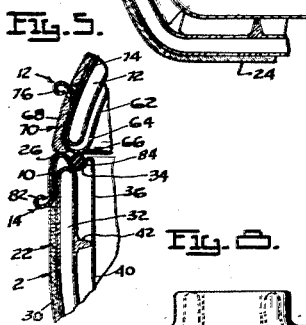
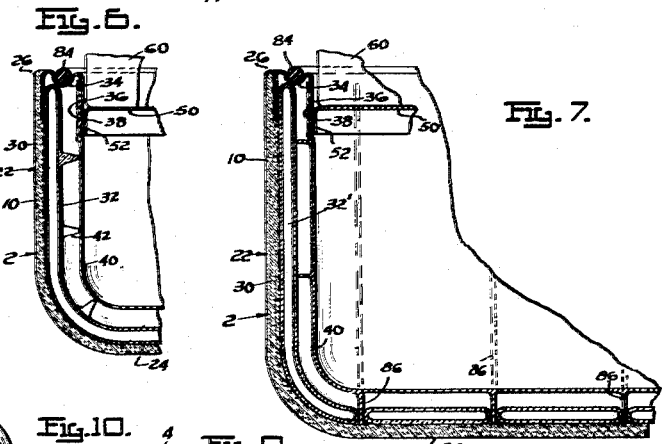
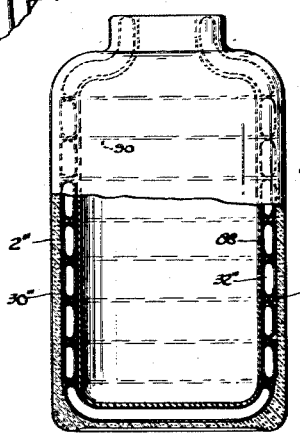
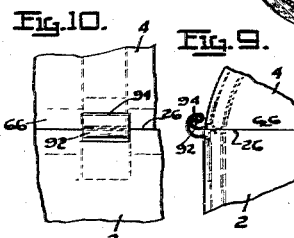
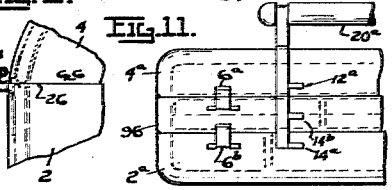
INVENTORS
JOHN E. JOHNSON
ADOLPH F. GRAF von SODEN
BY
ATTORNEY

United States Patent Office 3,144,160
Patented Aug. 11, 1964

3,144,160
RECEPTACLES WITH VACUUM CELL UNITS
OR THE LIKE
John E. Johnson, 4918 Del Monte St., San Diego 7, Calif.,
and Adolph F. Graf von Soden, 4929 Noyes St. (Pacific
Beach), San Diego 9, Calif.; said Von Soden assignor
of ten percent to Leon R. Lopez, San Diego, Calif.
Filed Nov. 3, 1961, Ser. No. 150,007
7 Claims. (Cl. 220—9)

The invention relates to containers and more particularly to "Thermos" vessels or receptacles which are provided with removable covers or enclosures, adapted for retaining therein food, liquid and edibles, such that may be used for human consumption, and also such that may be required to be kept hot or cold.

Manifestly, an object of the invention is to provide a "Thermos" container having a suitably arranged cover or enclosure, said container having divisional compartments adapted for segregating the food or edibles deposited therein, also, said container having a hollow depression provided with a wall suitably arranged for retaining therein a vacuum cell unit, so that when said container is covered with said enclosure then the temperature or the frigidity of the food deposited and confined therein may be retained and maintained.

Accordingly an object of the invention is to provide a "Thermos" container and a cover therefor, each having a hollow depression surrounded by a wall extending to a base and the ceiling respectively and wherein a plurality of suitably constructed U-shaped vacuous unit means may be secured, also, said container and cover having a plurality of suitable locking and clamping means adapted for holding said container and cover together in closed position, and in addition, having suitable safety locks provided therein which are arranged for extending therefrom and terminating with a carrying handle, so that said container when in closed position may be easily carried when required.

A further object of the invention is to provide the interior of said hollow section of said "Thermos" container and cover with a suitable interior lining adapted for separating said plurality of vacuous cell unit means from the food material deposited therein.

Another object of the invention is to provide said "Thermos" container or receptacle with an interior separator for enclosing and separating the contents deposited therein, said interior separator having an upwardly extending divisional plate protruding into the internal area of the cover associated with said container for providing suitable compartments in said cover area, so that diversified food may be enclosed and carried therein.

Another object of the invention is to provide a "Thermos" container and the cover used therewith each having a plurality or a bank of vacuous unit means mounted therein and surrounded by walls of suitable thickness and adapted for retaining therein said vacuous unit means or cells, each of which is arranged in U-shaped sections, said sections may be of any desired shape or configuration and adapted for resting in place individually and endwardly at one section against the other, said endwardly disposed vacuous cell sections having separator plates disposed therebetween, said plates to be separate or be made an integral part of said interiorly disposed lining for eliminating the shock of an outward pressure and for preventing a rupture or breaking of said individual vacuous cell sections, and also for allowing said vacuous cell sections to be replaced when same become defective or rendered inoperative.

The invention also has for its objects to provide such means that are positive in operation, convenient in use, easily installed in a working position and easily disconnected therefrom, economical in manufacture, relatively simple, and of general superiority and serviceability.

The invention also comprises novel details of construction and novel combinations and arrangements of parts, which will more fully appear in the course of the following description.

Reference is had to the accompanying drawings, in which the similar reference characters denote the same parts.

In the drawings:

FIG. 1 shows an end elevational view of the "Thermos" container provided with an enclosure and a carrying handle therefor.

FIG. 2 shows a side elevational view of the "Thermos" container showing same from the right side of FIG. 1.

FIG. 3 is a top plan view of the "Thermos" container, showing the hollow interior structure thereof and having the enclosure removed from its mounted position.

FIG. 4 shows a fragmentary sectional view of the side wall of the "Thermos" container showing the vacuous cell mounted therein, taken on the line 4—4 of FIG. 3, and also showing a fragmentary sectional wall of the enclosure when in position and disclosing the vacuous cell disposed within the wall thereof, including the relative locking arrangement in form of a lock or a fastener for holding said "Thermos" container and said enclosure in a closed position.

FIG. 5 shows a fragmentary sectional view of the side wall of the "Thermos" container, taken on lines 5—5 of the FIG. 3, also showing a fragmentary view of the side wall of the enclosure when in position and enclosing said container disposed thereunder.

FIG. 6 is a fragmentary sectional view of the side wall of the "Thermos" container, showing the combination of the interior lining plate and the vertical divisional plate when in position, and taken on lines 6—6 of the FIG. 3.

FIG. 7 shows an enlarged fragmentary sectional view of the end wall of the "Thermos" container, similar in position as shown in the FIG. 6, showing same with the vacuous cells in position.

FIG. 8 shows a partly elevational and partly sectional view of a "Thermos" container, disclosing a cylindrical vessel or flask, and showing the individual vacuous cells in position and within the wall structure thereof.

FIG. 9 shows a fragmentary sectional view of the hinge for said container and said enclosure, showing said hinge in a modified form.

FIG. 10 shows a fragmentary front elevational view of the hinge, taken from left of the FIG. 9.

FIG. 11 shows a fragmentary elevational view of the container, showing a sub-layer receptacle in position and the enclosure thereabove, showing same in a modified form.

Describing the invention more in detail, in its broader aspects, said invention comprises a lower "Thermos" container or a receptacle 2, having a top "Thermos" enclosure or cover 4 mounted thereover and which are held together in place by means of suitable spring locks 6 disposed at the front side and the rear side edges 8 and 10 respectively, for holding said container and said cover in closed position.

Said front and rear side edges 8 and 10 are also provided with safety locks 12 and 14, each having suitable lock straps 16 and 18 respectively, made of suitable spring ribbon stock material, and extending upwardly as shown in FIGS. 1 and 2, the upper ends of which being formed into loops adapted for holding and fastening a carrying handle 20 in position.

Said container 2 is provided with a central depression surrounded by a wall 22 wherein the lower most section blends into a base 24 for forming the depth of said container 2, said wall 22 extends upwardly for forming an open top which terminates at the upper rim section 26 and thus forming the respective ends of said container including said front and rear side edges 8 and 10 respectively.

The wall 22 including said base 24 of said "Thermos" container comprise an outer layer 30 which is preferred form is made out of a nonconductive material and of suitable thickness, such as paper board, papier-mache, plastic or the like, for minimizing the heat transfer therein and which, if so desired same may be sprayed with a suitable water-proof material or compound.

Interiorly within said hollow depression of said outer layer 30 a plurality of U-shaped vacuous unit cells 32 are positioned, the upwardly extending ends thereof are supported and held in palce by means of a rim closure 34 for enclosing said upper rim section 26, and which in construction is made in two individual and longitudinal parts and then welded together, or, said rim closure may be made out of plastic for securing a pleasant appearance as an article of manufacture.

The inner side of said rim closure 34 is formed into an apron 36 which extends downwardly and interiorly of said "Thermos" container 2, the end of said apron being interlocked with the upper end section 38 of the internal lining 40 disposed in said container and thus together with said outer layer 30 forming said wall 22, as shown.

Said U-shaped vacuous cells or units 32 are formed to suit the hollow configuration of said container 2, and each of which is provided with a plurality of projections 42 which extend outwardly from the inner cell wall for providing a contact support for said internal lining 40 and thereby holding said lining firmly in place and also preventing said vacuous cells or units 32 from shifting when in position.

The interlocking connection between said downwardly extending apron 36 and said upper end section 38 of said lining 40 may be made in any suitable and conventional maner, so that a solid and a leak proof contact between said respective parts may be had.

Said interior lining 40 covering said hollow section may be out of plastic or stainless steel, as in practice may be found to be most practicable and desirable, and interiorly thereof a suitable cross wall 44 is provided for forming a pair of compartments 46 and 48 respectively, said compartments being for separating the food that is deposited within said "Thermos" container 2, also, said cross wall 44 may, if so desired, be made an integral part of said interior lining 40 or be made a detachable and removable part thereof.

In close proximity to and interiorly within said rim closure 34 said container 2 is provided with a separator plate 50 which encloses the entire open area and also separates the lower section of said container 2 from the upper section of said enclosure 4 disposed thereover.

Said separator plate 50 is provided with a downwardly extending ridge or flange 52, said flange is supported by means of a plurality of suitable projections or blisters 56 provided in said lining 40 so that a uniform position of said separator plate 50 may be maintained when in position, or, in order to hold said supporting plate 50 in place, said lowermost edge of said apron 36 may be provided with a plurality of interiorly formed dents or stop ridges (not shown) which may bear against said flange 52 and thereby maintaining said plate 50 in position, when in use.

The upper section of said separator plate 50 is also provided with an upwardly extending divisional plate 60 which may, if so desired, be made removable and detachable, the uppermost edge of which extends into the interior of the roof plate 62 of said enclosure or cover 4, as shown.

Said cover 4 is provided with a semi-circular roof structure having said roof plate 62 extending interiorly for covering the entire roof area as shown in FIG. 1 and partly in FIG. 4, thus securing a suitable space therein for accommodating said upwardly extending divisional plate 60 of said separator plate 50.

Said roof plate 62 covers the entire interior surface area of said cover 4, the lower ends of which extend to and terminate at the cover edge 64 having a suitably rounded ridge 66 which blends with an outer insulating layer 68 for forming in combination a cover wall 70.

Interiorly of said cover wall 70 and between said insulating layer 68 and said cover roof plate 62 a plurality of U-shaped vacuous cells 72 are mounted and suitably secured in place between said respective parts, and in order to ensure their mounted position said rounded ridge 66 at the longitudinally extending edge sides of said cover 4 is provided with a pair of binding straps 74 which extend over the outer surface of said plurality of cover vacuous cells 72 as shown in FIG. 5, and thereby preventing same from shifting out of position.

The lower ends of said binding straps 74 are each provided with a suitable eyelet or loop 76 as shown in FIGS. 4 and 5, which extend outwardly through said insulating layer 68 and each of which is adapted for engaging the respective pins 78 projecting endwardly and near the respective ends from said spring lock straps 16 and 18.

As shown in FIG. 2, the lowermost ends of said spring lock straps 16 and 18, are each provided with a lock pin 80 and which are sprung inwardly toward the center for engaging an eyelet 82 extending from the receptacle safety locks 14, which are substantially an integral part of said outwardly positioned and extending rim closure 34, of said "Thermos" container 2. When said ends of said spring lock straps 16 and 18 are sprung inwardly and directed to the center as hereinbefore mentioned then the respective lock pins 78 and 80 are allowed to become disengaged from the respective loops or eyelets 76 and 82.

In this manner, said lower "Thermos" container 2 and said cover 4 are held in position for preventing an accidental separation thereof, and in order to secure a seal between said rim section 26 of said container 2 and said ridge 66 of said cover 4, a suitable rubber seal 84 is provided within a depression provided in said rim closure 34 as shown.

Said lock straps 16 and 18 including said carrying handle 20 may be made out of suitable material and be made in any suitable configuration as in practice may be found to be most desirable and practicable, also, said safety locks 14 and 16 including said spring locks 6 may be of a conventional design and construction, so that the best results may be attained from the practical and the manufacturing point of view.

As shown in FIG. 7, said "Thermos" container 2 is provided with a plurality of detachable vacuous cells 32' which are made in sections and are held in position by a plurality of suitable separating strips 86, said strips are provided in and are extending outwardly from said lining 40.

Said separating strips 86 may be detachable and separate, so that same may be used as a cushion for said individual U-shaped vacuous cells 32' which are made thereby removable and interchangeable when broken or damaged.

In FIG. 8 the modification discloses a cylindrical vessel or "Thermos" container 2″ provided with a centrally positioned internal lining 88 around of which a plurality of circular vacuous cells 32″ are mounted and separated from each other by means of suitable shock resisting cushion rings or plates 90, for separating said vacuous cells from each other and also for providing a cushion therebetween, so that when any of said vacuous cells become damaged or inoperative then same may be removed and exchanged for new.

Also, said "Thermos" container 2″ is provided with an outer layer 30″ which insulates said vacuous cells 32″ when in place, said outer layer may be made out of suitable material for providing a pleasant appearance for the article of manufacture.

It may also be noted, that said cushion rings or plates 90 may be made as an integral part of said internal lining 88 and thereby strengthening said cylindrical container 2″, and that said vacuous cells 32″ may be made in U-shaped half sections and adapted for abutting their circularly extending ends when in position (not shown), for providing easy access to and for the removal and exchange of said U-shaped vacuous cells 32″ when required and necessary or when damaged.

Also, it may be noted that either the front side 8 or the rear side 10 of said "Thermos" container 2 may, if so desired be provided with a pair of grip locks, as shown in FIGS. 9 and 10.

Said grip locks comprise a male catch member 92 which is disposed in close proximity to the rounded edge 66 of said cover 4 and a female catch member 94 disposed at the edge of said rim section 26 of said container 2, for allowing said respective members to lock into one another, as shown, and it may further be noted, that only a pair of said spring locks 6 may be required at the opposite side of said grip locks for holding said cover in closed position over said container.

As shown in FIG. 11, the modification discloses that said "Thermos" container 2<sup>a</sup> and said "Thermos" cover 4<sup>a</sup> are provided with a sub-layer receptacle 96 disposed therebetween, which are held in closed position by means of said spring locks 6<sup>a</sup> and 6<sup>b</sup>, supported in place by means of said safety locks 12<sup>a</sup>, 14<sup>a</sup> and 14<sup>b</sup> connecting the respective lock straps of which the upper end thereof terminate with said carrying handle 20<sup>a</sup>.

Said sub-layer receptacle 96 may, if so desired, be provided with suitable compartments for retaining therein diversified food material, and, that the wall thereof may also be provided with suitable vacuous cells (shown partly in dotted lines) and be similar in structure as shown in FIG. 7.

While this invention is described with great particularity it will be clear that the same may be modified throughout a wide range. We, accordingly, do not propose that this invention be limited to the exact details of construction herein shown on the drawings ad described in the specification, and that reservation of the rights in practice are retained, to the end that the necessary changes and modifications may be made therein, which may come within the scope of the appended claims.

We claim as the invention:

1. In a receptacle of the class described comprising in combination a lower container and a cover therefor, said lower container having an outer wall and a base blending with said wall, an upper rim section in said wall, an interior lining plate in said lower container, a rim closure covering connecting said upper rim section and extending the entire edge length thereof and also connecting to the upper edge of said interior lining plate, a flexible seal on said rim closure, said cover having a roof plate blending with said cover wall and having the rounded edge section thereof terminating with a rounded ridge for engaging said flexible seal on said rim closure of said lower container, a roof plate internally positioned in said cover, a pair of binding straps on said cover extending from said rounded ridge and terminating at the edge thereof, a plurality of spring locks at the side edges of said upper rim section of said lower container for engaging said binding straps in said cover wall thereby holding said lower container and said cover in sealed position, and a plurality of U-shaped vacuous cell means within said wall of said lower container and said cover wall for maintaining food temperature unchanged when deposited in said lower container and sealed by said cover of said receptacle.

2. In a receptacle of the class described comprising a lower container and a cover therefor, as defined in claim 1, wherein a plurality of safety lock members are provided on said lower container and said cover, a plurality of lock straps on said cover, pins in said lock straps for engaging respective companion lock members on said cover including said lower container and thereby preventing an accidental opening of said cover from its locked position, said safety lock members on said cover each having a lock strap, said cover lock straps extending in pairs and upwardly over said cover wall and terminating with a pair of extended ends thereover, and a carrying handle between said extended ends of said upwardly extending pair of lock straps for facilitating the handling of said receptacle.

3. In a receptacle with a cover of the class described, as defined in claim 1, wherein a cross wall is provided interiorly of said lower container for providing compartments therein, a plurality of blisters internally positioned and directed outwardly from said internal lining plate and positioned in close proximity to said upper rim section of said lower container, and a separator plate enclosing the open area of said lower container supported in position by said plurality of blisters and also having a divisional plate extending upwardly and into roof area of said cover for segregating articles of food when deposited thereon.

4. In a receptacle with a cover of the class described comprising, a container having a hollow wall, a base in said container blending with said hollow wall, an upper rim section in said hollow wall having a rim closure, a flexible seal on said rim closure, in combination with, a cover having a hollow wall structure, a roof in said cover formed by said hollow wall, structure blending with said cover structure, a rounded ridge at the edge of said cover wall for engaging said flexible seal on said rim closure of said container and thereby sealing said receptacle with said cover, a plurality of locking means at the edges of said container and said cover for holding same locked and in sealed position, and a plurality of vacuous cell means within said hollow walls of said container and said vacuous cell means having spacing projections for maintaining spaced position within said hollow walls of said lower container and said cover and for retaining food temperature unchanged when a quantity of food is deposited within said receptacle and enclosed by said cover.

5. In the container of the class described as defined in claim 4, wherein a plurality of separate, independent and removable vacuous cell means are provided internally within said hollow walls of said container and said cover, for facilitating their removal and exchange for new when same become damaged and inoperative.

6. In a container and cover of the class described as defined in claim 4, wherein a plurality of separator strips made of cushion material are provided within said hollow walls of said container and said cover and between the ends of said separate and removable vacuous cell means for providing a cushion therebetween and thereby preventing said vacuous cell means from becoming damaged.

7. In a container and cover of the class described, as defined in claim 4, wherein an insulating layer is provided outwardly of said vacuous cell means in said hollow walls of said container and said cover for preventing the temperature within said closed receptacle from becoming influenced by the outer atmospheric temperatures.

References Cited in the file of this patent

UNITED STATES PATENTS

| | | |
|---|---|---|
| 485,098 | Forshew | Oct. 25, 1892 |
| 1,890,655 | O'Leary | Dec. 13, 1932 |
| 2,611,851 | Lott | Sept. 23, 1952 |
| 2,717,093 | Mautner | Sept. 6, 1955 |
| 2,743,029 | Mautner | Apr. 24, 1956 |
| 2,954,893 | Sayre | Oct. 4, 1960 |

FOREIGN PATENTS

| | | |
|---|---|---|
| 455,923 | Great Britain | Oct. 27, 1936 |
| 1,042,469 | Germany | Oct. 30, 1958 |